(12) United States Patent
Suciu et al.

(10) Patent No.: US 8,789,354 B2
(45) Date of Patent: Jul. 29, 2014

(54) GAS TURBINE ENGINE WITH SEPARATE CORE AND PROPULSION UNIT

(75) Inventors: Gabriel L. Suciu, Glastonbury, CT (US); Wesley K. Lord, South Glastonbury, CT (US); Christopher M. Dye, San Diego, CA (US)

(73) Assignee: United Technologies Corporation, Hartford, CT (US)

( * ) Notice: Subject to any disclaimer, the term of this patent is extended or adjusted under 35 U.S.C. 154(b) by 101 days.

(21) Appl. No.: 13/370,750

(22) Filed: Feb. 10, 2012

(65) Prior Publication Data

US 2013/0205752 A1 Aug. 15, 2013

(51) Int. Cl.
*F02K 3/02* (2006.01)

(52) U.S. Cl.
USPC ............. 60/226.1; 60/796; 60/226.3; 60/263; 60/224

(58) Field of Classification Search
USPC ....................... 60/796, 224, 226.1, 263, 226.3
See application file for complete search history.

(56) References Cited

U.S. PATENT DOCUMENTS

| 3,318,095 | A | * | 5/1967 | Snell | ............................. 60/226.1 |
| 4,193,262 | A | * | 3/1980 | Snell | ................................ 60/761 |
| 6,571,563 | B2 | | 6/2003 | Yim et al. | |
| 6,735,954 | B2 | | 5/2004 | MacFarlane et al. | |
| 6,845,606 | B2 | * | 1/2005 | Franchet et al. | ................. 60/225 |
| 7,237,378 | B2 | * | 7/2007 | Lardellier | ..................... 60/226.1 |
| 7,802,757 | B2 | * | 9/2010 | Dooley et al. | .................... 244/60 |
| 2005/0060983 | A1 | * | 3/2005 | Lardellier | ..................... 60/226.1 |
| 2005/0204742 | A1 | | 9/2005 | Lair | |
| 2006/0185346 | A1 | * | 8/2006 | Rolt | ............................... 60/224 |
| 2007/0101721 | A1 | | 5/2007 | Dooley et al. | |
| 2009/0056309 | A1 | | 3/2009 | Roberge | |
| 2011/0056208 | A1 | | 3/2011 | Norris et al. | |

FOREIGN PATENT DOCUMENTS

EP 0082785 A2 6/1983

OTHER PUBLICATIONS

International Search Report and Written Opinion, PCT/US2013/024704 completed May 13, 2013.

* cited by examiner

*Primary Examiner* — Ehud Gartenberg
(74) *Attorney, Agent, or Firm* — Carlson, Gaskey & Olds, PC

(57) ABSTRACT

A gas turbine engine includes a propulsion unit mounted to rotate about a first axis, and a core engine mounted to rotate about a second axis, and wherein the first and second axes are non-parallel. A gas turbine engine includes a propulsion unit driven by a free turbine which is adjacent to the propulsion unit and an associated fan, and having a gas generator core engine including a compressor, combustor and turbine section. A method is also disclosed.

20 Claims, 3 Drawing Sheets

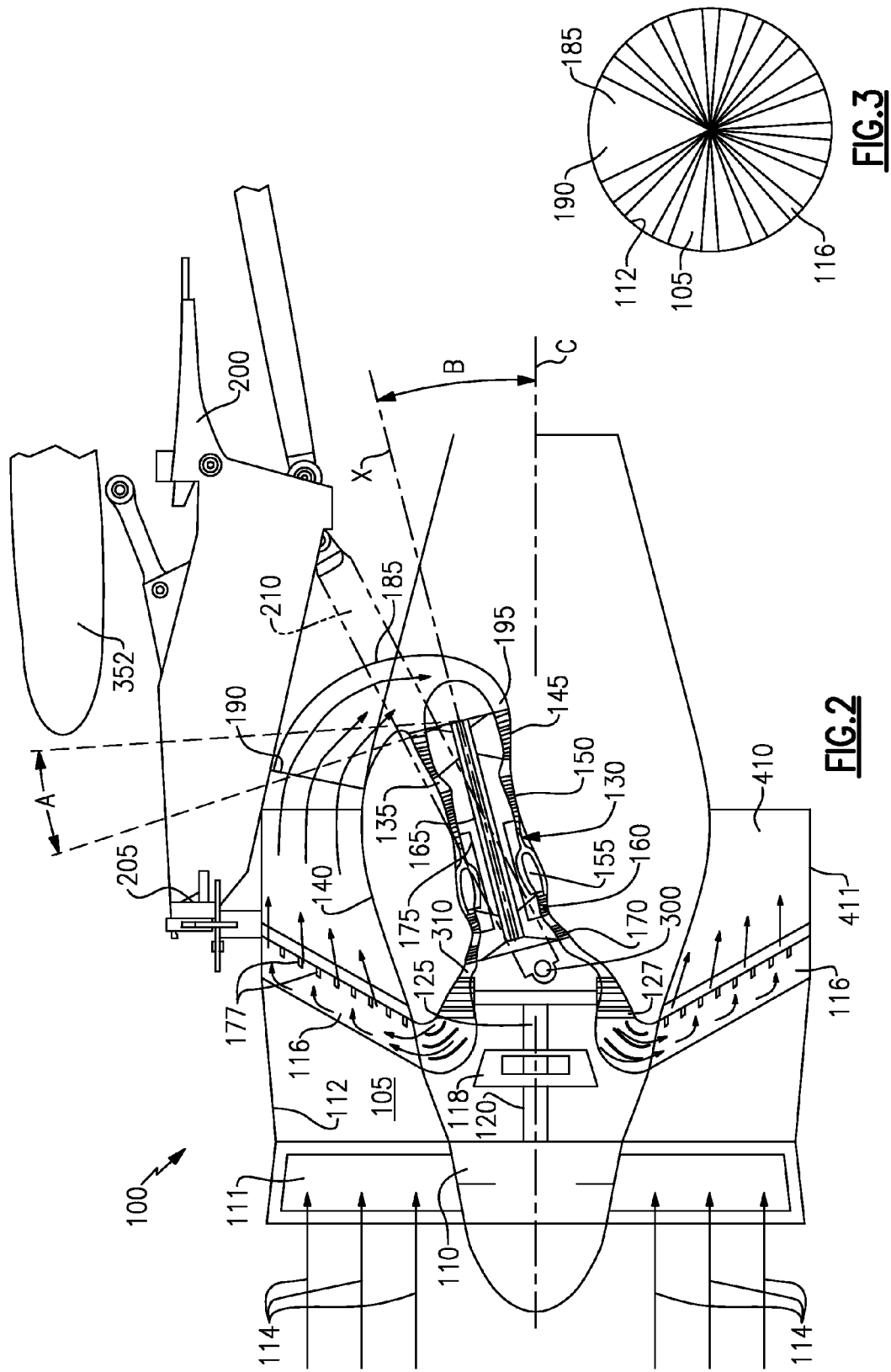

GAS TURBINE ENGINE WITH SEPARATE CORE AND PROPULSION UNIT

BACKGROUND OF THE INVENTION

This application relates to a gas turbine engine, wherein a core engine is mounted separately from a propulsion unit.

Gas turbine engines are known, and have typically included a fan delivering a portion of air into a bypass duct, and a second portion of air into a core flow leading into a compressor section. The air is compressed in the compressor and delivered downstream into a combustion section where it is mixed with fuel and ignited. Products of this combustion pass across turbine rotors which are driven to rotate, and in turn rotate the compressor and fan section. Historically one turbine section drove both a compressor stage and a fan at the same speed. More recently it has been proposed to incorporate a gear reduction such as the fan can rotate at slower speeds than the compressor stage. With this arrangement, the outer diameter of the fan can increase, and the outer diameter of the turbine and compressor sections can decrease.

Historically, the fan and compressors have been mounted coaxially, and have been driven by turbines that are at a rear end of the engine, with the fan and compressor at a forward end. It has typically not been possible to service any portion of the engine, without removing the concentrically rotating turbines, compressors and fan as a combined unit. At a minimum, service is made complex by the inter-relationships of these sections.

Another challenge with mounting gas turbine engines relates to the so called "disk burst zone." This zone is an area where broken pieces from a core engine could be driven.

The disk burst zone extends for approximately 30° about the last stage of the gas turbine engine. The gas turbine engine is typically mounted to an aircraft wing through a pylon. The aircraft wing also includes a fuel tank. There is a limitation on the mounting of current gas turbine engines in that the disk burst zone cannot extend through the fuel tank. Thus, gas turbine engines have typically been necessarily been mounted somewhat forwardly on the aircraft wing.

SUMMARY OF THE INVENTION

In a featured embodiment, a gas turbine engine has a propulsion unit including a fan, and a free turbine connected to drive the fan about a first axis. A core engine includes at least a compressor, a combustion section, and a turbine. The core engine turbine is connected to drive the compressor. The compressor and the core engine turbine rotate about a second axis. The first and second axes are non-parallel to each other.

In another embodiment according to the previous embodiment, a gear reduction is between the free turbine and fan.

In another embodiment according to the previous embodiment, an angle is defined between the first and second axes. The angle has a component that extends in a direction that will approach an aircraft wing that is to mount the gas turbine engine.

In another embodiment according to the previous embodiment, an angle is defined between the first and second axes. A range of the angle is greater than zero and less than or equal to about 90°.

In another embodiment according to the previous embodiment, the fan delivers air into a main duct. The main duct has an inlet tapping a portion of the air from the main duct into a turning duct which feeds air into the compressor.

In another embodiment according to the previous embodiment, the turning duct generally reverses a direction of flow of air from the main duct into the compressor.

In another embodiment according to the previous embodiment, an outlet of gas downstream of the free turbine extends back into the main duct.

In another embodiment according to the previous embodiment, the outlet extends into the main duct through struts extending across the main duct.

In another embodiment according to the previous embodiment, the struts are positioned upstream of the location where the turning duct taps air from the main duct.

In another embodiment according to the previous embodiment, the struts which have the outlet of gas downstream of the free turbine are circumferentially spaced from the inlet into the turning duct.

In another embodiment according to the previous embodiment, a connecting duct connects the core engine turbine to the free turbine.

In another embodiment according to the previous embodiment, the connecting duct is a mount location for mounting the core engine to an aircraft.

In another embodiment according to the previous embodiment, there are two turbine stages and two compressor stages in the core engine.

In another embodiment according to the previous embodiment, the propulsion unit is positioned such that its free turbine and fan are in a forward end of the gas turbine engine. The core engine is spaced rearwardly, and is separate from the propulsion unit.

In another featured embodiment, an aircraft has a wing and a pylon mounting a gas turbine engine to the wing. The gas turbine engine includes a propulsion unit including a fan, and a free turbine connected to drive the fan about a first axis, a core engine including at least the compressor, a combustion section, and a turbine. The core engine turbine is connected to drive the compressor. The compressor and core engine turbine rotate about a second axis. The first and second axis are non-parallel to each other.

In another embodiment according to the previous embodiment, an angle may be defined between the first and second axes. The angle has a component extending in a direction that will approach an aircraft wing which is to mount the gas turbine engine.

In another embodiment according to the previous embodiment, a connecting duct connects the core engine turbine to the free turbine.

In another embodiment according to the previous embodiment, the connecting duct is a mount location for mounting the core engine to the wing.

In another embodiment according to the previous embodiment, a strut extends from the pylon to be connected to the connecting duct.

In another embodiment according to the previous embodiment, there are two turbine stages and two compressor stages in the core engine.

In another featured embodiment, a gas turbine engine has a propulsion unit including a fan, and a free turbine connected to drive the fan. A core engine includes at least a compressor, a combustion section and a turbine. The core engine turbine is connected to drive the compressor. The compressor and core engine turbine are positioned toward an outlet end of the gas turbine engine relative to the propulsion unit. The core engine is separate from the propulsion unit.

In another embodiment according to the previous embodiment, the core engine compressor receives air from a main air duct. The fan delivers air into the main air duct. The air delivered into the core engine compressor is compressed, passed into the combustion section, and products of combustion pass over turbine rotors heading in a direction back toward the fan. The free turbine receives the products of combustion downstream of the core engine turbine. A connecting duct connects the core engine to the free turbine.

In another embodiment according to the previous embodiment, the core engine rotates on an axis which is co-linear with a rotation axis of the free turbine and fan.

In another embodiment according to the previous embodiment, the fan is positioned at an inlet end of a main air duct. The free turbine is positioned between the inlet end and core engine relative to an axial dimension extending along a rotational axis of the fan, and from the inlet end toward an outlet end of the main duct.

In another featured embodiment, a method of mounting a gas turbine engine to an aircraft wing includes providing a propulsion unit including a fan and a free turbine connected to drive the fan about a first axis, and connecting a core engine to the free turbine. The core engine includes at least a compressor, a combustion section, and a turbine. The core engine turbine is connected to drive the compressor. The compressor and core engine turbine rotate about a second axis. The first and second axes are non-parallel to each other. The second axis is selected to move a disk burst zone forwardly relative to an aircraft wing such that a gas turbine engine incorporating the propulsion unit and core engine can be mounted further rearwardly on the aircraft wing.

In another embodiment according to the previous embodiment, an angle between the first and second axes is selected to control the desired amount of movement of the disk burst zone.

BRIEF DESCRIPTION OF THE DRAWINGS

FIG. 2 is a cross-sectional view of an inventive gas turbine engine.
FIG. 3 is a partial view of a portion of the FIG. 2 engine.

DETAILED DESCRIPTION

Figure 1:
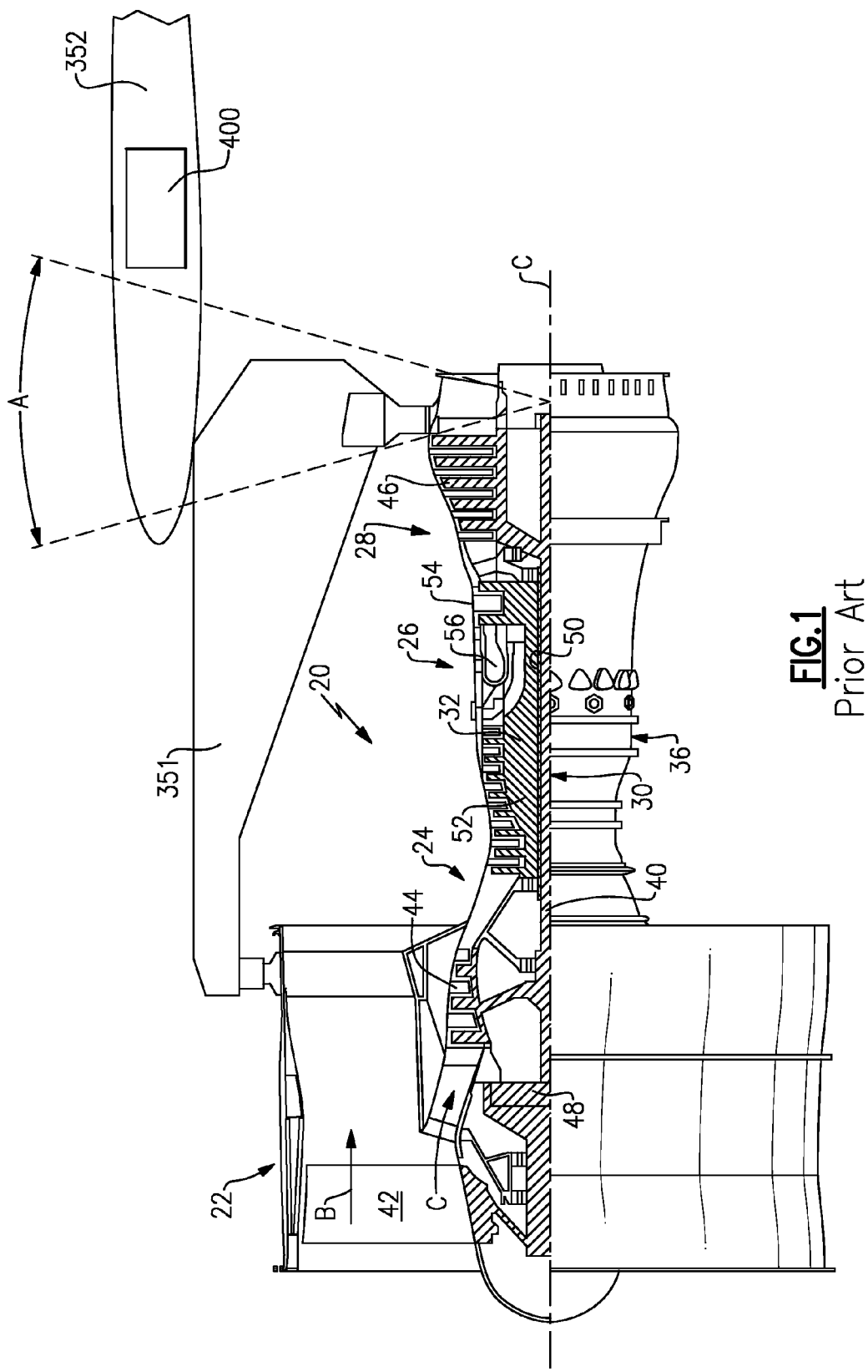
FIG. 1 schematically shows a prior art gas turbine engine.

FIG. 1 schematically illustrates a known gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis C relative to an engine static structure 36.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. The inner shaft 40 and the outer shaft 50 are concentric and rotate about the engine central longitudinal axis C which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion.

An aircraft wing 352 is shown with the gas turbine engine 20 mounted somewhat forwardly of the engine. A pylon 351 mounts the gas turbine engine to the wing 352. As shown, a disk burst zone A extends for about 30° across an exit point of the gas turbine engine. This is an area where portions of the gas turbine engine which may fracture, such as portions of the rotor disks, could fly outwardly and damage the wing, as an example. A limitation on the design of where to mount a gas turbine engine is that the disk burse zone A cannot extend across the area where a fuel tank 400, shown schematically, is mounted. Thus, this has somewhat limited the mounting of gas turbine engines in the past.

As can be appreciated from FIG. 1, the turbines, compressors are all inter-related and rotate on a common axis with the extending spools 30/32. As can be appreciated from FIG. 1, it is somewhat difficult to remove the turbine, compressors, or fans separately from one another for service.

FIG. 2 shows an inventive engine 100. Air at 114 approaches a fan rotor 111 which is driven to rotate with a fan hub 110. A shaft 120 is driven through a gear reduction 118, which is in turn driven by a shaft 125. Shaft 125 is driven by a free turbine 127. A duct 310 communicates products of combustion from a core engine 130 that includes low pressure turbine 170, a high pressure turbine 160, a combustor 155, and a compressor section including a high pressure compressor 150 and a low pressure compressor 145. A spool 165 rotates the low pressure spool while a spool 175 rotates the high pressure spool.

An inlet duct 195 communicates air from a turning duct 185 into the low pressure compressor 145. An opening 190 takes air from a main duct 105. A pylon 200 mounts the engine 100 to an aircraft wing 352.

A centerline X of core engine 130 incorporating the compressor sections 145, 150, combustor 155 and compressor sections 160 and 170 is offset by an angle B from a center line C of the shaft 120/125. Thus, the fan rotor 111 rotates about axis C while the core engine 130 rotates about an axis X, which is offset by an angle B. The angle B may be some non-zero angle, or as described below, may be zero in at least some embodiments. In embodiments which position the core engine to be offset, the angle B may be greater than zero and less than or equal to about 90°. Note other angles can be utilized. The burst zone features are maximized across this range.

For purposes of the FIG. 2 embodiment, and for moving the burst zone A, the angle B should be greater than zero.

As further shown, a strut 210 extends from the pylon 200 and mounts to the duct 310.

In the engine 100, rather than delivering air into a core airflow at a fan side of the engine, all of the air is delivered into the duct 105. A propulsion unit including the free turbine 127, gear reduction 118, and fan rotor 111 deliver this air beyond struts 116, and to an outlet 410 of a cowl 411. This provides the bulk of the propulsion for the engine. The inlet 190 into the turning duct 185 takes a portion of the air and delivers it into the inlet 195 for the compressor 145. The air is compressed, delivered into the higher compressor section 150, into the combustion section 155, and across turbines 160 and 170, which in turn drive the compressors 150 and 145. Air downstream of the turbine section 170 passes through the duct 310, and is driven across the free turbine 127. The free turbine 127 drives gear reduction 118 to in turn cause the fan blades 111 to rotate.

Air downstream of the free turbine section 127 passes back outwardly and into the duct 105 through openings in struts 116.

As can be appreciated from FIG. 2, since the core engine 130 is mounted at an axis which is non-parallel to the axis C, the disk burst zone A is shifted, or angled, forwardly away from the wing 352. Now, the engine may be mounted further rearwardly underneath the wing than has been the case in the prior art. Essentially, a core engine, mounted at an axis which is non-parallel to the axis of a propulsion unit C would achieve this benefit whenever the axis X is mounted to extend toward the wing 352. That is, if the angle B has at least a component extending toward the wing 352 from the propulsion unit drive axis C, then this forward movement of the disk burst zone A will be achieved. The amount of movement can be controlled by changing the size of the angle B. A method of selecting the angle B to position to disk burst zone A such that the engine can be mounted further rearwardly under the wing would also be apparent from the above disclosure.

As can be appreciated in FIG. 3, there are a plurality of struts 116 delivering air back into the duct 105. Generally the struts which deliver air into the duct are not aligned with the opening 190 into the turning duct 185.

Figure 4:
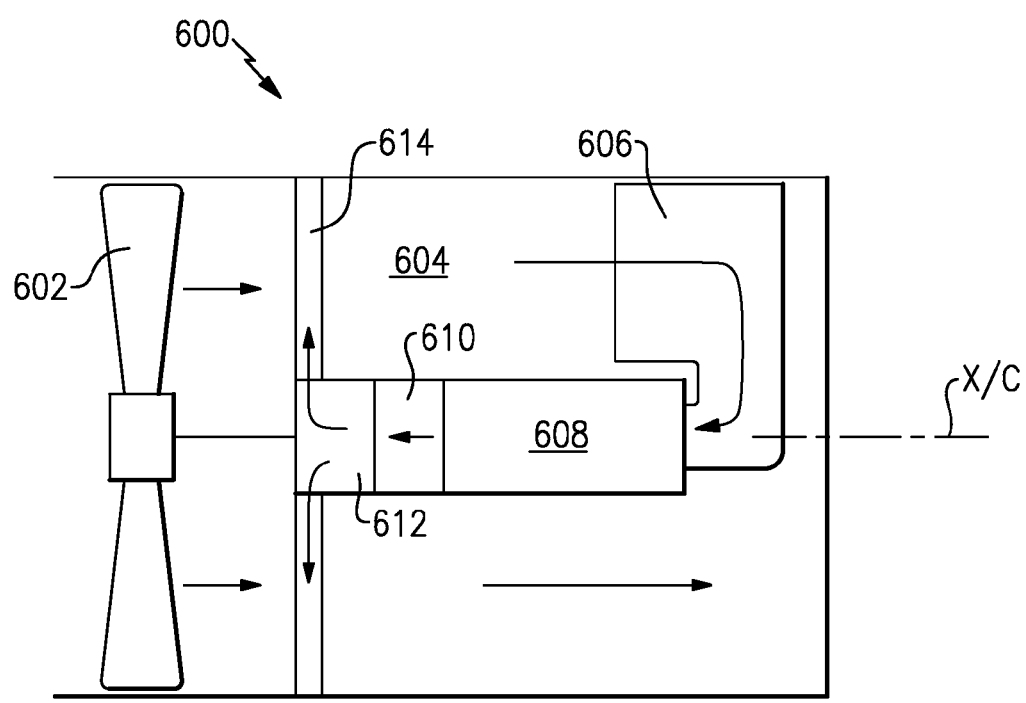
FIG. 4 is an alternative embodiment.

An embodiment 600 is shown schematically in FIG. 4. As shown, a core engine 608 may communicate gas flow from an inlet duct 606, through a compressor and turbine section as shown in FIG. 2. Products of the combustion downstream of the turbine sections in the core engine 608 pass into a connecting duct 610, and then across a free turbine 612. The free turbine 612 may drive the fan rotor 602. The outlet gas from the free turbine 612 may be directed through the struts 614 and into a main duct 604. As shown in this Figure, there is a separate propulsion unit including the free turbine 612 and fan rotor 602. This may also include a gear reduction in some embodiments. The separate propulsion unit is positioned forward or toward the inlet of the gas turbine engine 600, while the core engine is spaced rearwardly of the propulsion unit, and is separate from the propulsion unit. With this embodiment, servicing of the core engine relative to the propulsion unit is simplified compared to the prior art.

The fan 602 is positioned at an inlet end of a main air duct 604. The free turbine is between the inlet end and the core engine 608 relative to an axial dimension extending along a rotational axis of the fan, and from the inlet end toward an outlet end of the main duct.

Further modifications which can flow given the separate propulsion unit and core engines, and in particular, the ability to provide modular engines, are disclosed in co-pending U.S. patent application Ser. No. 13/370,743, filed on even date herewith and entitled "Gas Turbine Engine With Modular Cores and Propulsion Unit."

Although an embodiment of this invention has been disclosed, a worker of ordinary skill in the art would recognize that certain modifications would come within the scope of this invention. For that reason, the following claims should be studied to determine the true scope and content of this invention.

The invention claimed is:

1. A gas turbine engine comprising:
   a propulsion unit including a fan, and a free turbine connected to drive said fan about a first axis;
   a core engine, said core engine including at least a compressor, a combustion section, and a turbine, having an outlet, said core engine turbine connected to drive said compressor, and said compressor and said core engine turbine rotating about a second axis;
   said first and second axes being non-parallel to each other; and
   said fan delivering air into a main duct, and said main duct having, an inlet tapping a portion of the air from said main duct into a turning duct which feeds air into said compressor, wherein the inlet is downstream of the turbine outlet.

2. The gas turbine engine as set forth in claim 1, wherein a gear reduction is provided between said free turbine and said fan.

3. The gas turbine engine as set forth in claim 1, wherein an angle is defined between said first and second axes, with said angle having a component extending in a direction that will approach an aircraft wing which is to mount said gas turbine engine.

4. The gas turbine engine as set forth in claim 1, wherein an angle is defined between said first and second axes, and a range of said angle being greater than zero and less than or equal to about 90°.

5. The gas turbine engine as set forth in claim 1, wherein said turning duct generally reverses a direction of flow of air from the main duct into the compressor.

6. The gas turbine engine as set forth in claim 5, wherein an outlet of gas downstream of said free turbine extends back into said main duct.

7. The gas turbine engine as set forth in claim 6, wherein said outlet extends into said main duct through struts extending across said main duct.

8. The gas turbine engine as set forth in claim 7, wherein said struts are positioned upstream of the location where said turning duct taps air from said main duct.

9. The gas turbine engine as set forth in claim 8, wherein said struts which have said outlet of gas downstream of said free turbine are circumferentially spaced from said inlet into said turning duct.

10. The gas turbine engine as set forth in claim 1, wherein a connecting duct connects said core engine turbine to said free turbine.

11. The gas turbine engine as set forth in claim 10, wherein said connecting duct is a mount location for mounting said core engine to an aircraft.

12. The gas turbine engine as set forth in claim 1, wherein there are two turbine stages and two compressor stages in said core engine.

13. The gas turbine engine as set forth in claim 1, wherein the propulsion unit is positioned such that its free turbine and fan are in a forward end of the gas turbine engine, and the core engine is spaced rearwardly, and is separate from the propulsion unit.

14. An aircraft including:
   a wing and a pylori mounting a gas turbine engine to said wing;
   said gas turbine engine including a propulsion unit including a fan, and a flee turbine connected to drive said fan about a first axis, a core engine, said core engine including at least the compressor, a combustion section, and a turbine, having an outlet, said core engine turbine connected to drive said compressor, and said compressor and said core engine turbine rotating about a second axis, said first and second axis being non-parallel to each other;

said fan delivering air into said compressor, wherein the compressor has an inlet that downstream of the turbine outlet;

a connecting duct connects said core engine turbine to said free turbine;

said connecting duct is a mount location for mounting said core engine to said wing; and a strut extends from said pylori to be connected to said connecting duct.

15. The aircraft as set forth in claim 14, wherein an angle may be defined between said first and second axes, with said angle having a component extending in a direction that will approach an aircraft wing which is to mount said gas turbine engine.

16. The aircraft as set forth in claim 14, wherein there are two turbine stages and two compressor stages in said core engine.

17. A gas turbine engine comprising:

a propulsion unit including a fan, and a free turbine connected to drive said fan about a first axis;

a core engine, said core engine including at least a compressor, a combustion section, and a turbine, having an outlet, said core engine turbine connected to drive said compressor, and said compressor and said core engine turbine rotating about a second axis;

said first and second axes being non-parallel to each other; and said fan delivering a portion of the air it moves into a main duct, and said main duct having, an inlet tapping a portion of the air from said main duct into a turning duct which feeds air into said core engine compressor, wherein the inlet is downstream of the turbine outlet.

18. The gas turbine engine as set forth in claim 17, wherein a connecting duct connects said core engine turbine to said free turbine.

19. The gas turbine engine as set forth in claim 17, wherein said connecting duct is a mount location for mounting said core engine to said wing.

20. The gas turbine engine as set forth in claim 17, wherein a strut extends from said pylori to be connected to said connecting duct.

* * * * *

UNITED STATES PATENT AND TRADEMARK OFFICE
CERTIFICATE OF CORRECTION

| | |
|---|---|
| PATENT NO. | : 8,789,354 B2 |
| APPLICATION NO. | : 13/370750 |
| DATED | : July 29, 2014 |
| INVENTOR(S) | : Gabriel L. Suciu |

It is certified that error appears in the above-identified patent and that said Letters Patent is hereby corrected as shown below:

IN THE CLAIMS:

In claim 14, column 6, line 60; replace "pylori" with --pylon--

In claim 14, column 6, line 63; replace "flee" with --free--

In claim 14, column 7, line 11; replace "pylori" with --pylon--

In claim 20, column 8, line 20; replace "pylori" with --pylon--

Signed and Sealed this
Twenty-eighth Day of October, 2014

Michelle K. Lee
*Deputy Director of the United States Patent and Trademark Office*